(12) United States Patent
Summers

(10) Patent No.: US 10,099,816 B2
(45) Date of Patent: Oct. 16, 2018

(54) PORTABLE COOLING ASSEMBLY

(71) Applicant: Floyd Summers, Los Angeles, CA (US)

(72) Inventor: Floyd Summers, Los Angeles, CA (US)

( * ) Notice: Subject to any disclaimer, the term of this patent is extended or adjusted under 35 U.S.C. 154(b) by 0 days.

(21) Appl. No.: 15/463,691

(22) Filed: Mar. 20, 2017

(65) Prior Publication Data

US 2018/0265257 A1 Sep. 20, 2018

(51) Int. Cl.
| | | |
|---|---|---|
| *B65D 23/10* | (2006.01) | |
| *B65D 43/06* | (2006.01) | |
| *B65D 25/10* | (2006.01) | |
| *B65D 81/05* | (2006.01) | |
| *B65D 81/38* | (2006.01) | |
| *B65D 25/28* | (2006.01) | |
| *B65D 25/38* | (2006.01) | |
| *B60P 3/20* | (2006.01) | |

(52) U.S. Cl.
CPC .............. *B65D 25/10* (2013.01); *B60P 3/205* (2013.01); *B65D 25/282* (2013.01); *B65D 25/2805* (2013.01); *B65D 25/38* (2013.01); *B65D 43/06* (2013.01); *B65D 81/05* (2013.01); *B65D 81/3813* (2013.01); *B65D 2231/005* (2013.01); *B65D 2525/286* (2013.01); *B65D 2581/05* (2013.01)

(58) Field of Classification Search
CPC .. B65D 25/10; B65D 25/2805; B65D 25/282; B65D 25/38; B65D 43/06; B65D 81/05; B65D 81/3813; B65D 2231/005; B65D 2525/286; B65D 2581/05; B60P 3/205

USPC ............................................ 280/47.34, 79.2
See application file for complete search history.

(56) References Cited

U.S. PATENT DOCUMENTS

| | | | |
|---|---|---|---|
| 4,424,687 A | 1/1984 | Morgan | |
| 4,515,421 A | 5/1985 | Steffes | |
| 4,551,988 A * | 11/1985 | Petrantoni | ................. F25D 3/06 62/457.1 |
| 5,052,184 A | 10/1991 | Jarvis | |
| 5,524,761 A * | 6/1996 | Wayman | ................. A45C 11/20 206/541 |
| 5,953,931 A | 9/1999 | Brittan | |
| 6,126,124 A | 10/2000 | Wagner | |
| 6,626,006 B1 | 9/2003 | Tedder | |
| D608,157 S | 1/2010 | White | |

(Continued)

FOREIGN PATENT DOCUMENTS

WO WO2011146528 11/2011

*Primary Examiner* — John D Walters

(57) ABSTRACT

A portable cooling assembly for separating food and beverages from ice includes a shell that has a top, which is open. A lid is reversibly couplable to the shell to close the top. The lid and the shell are insulated. A grate is positioned to reversibly couple to the shell substantially equally distant from a bottom and a midpoint of the shell. The grate defines an upper chamber and a lower chamber. A plurality of baskets is reversibly couplable to the shell and positionable in the upper chamber. The baskets are positioned proximate to the top. The top is configured to insert ice into the lower chamber, followed by the grate, and then articles, such as food and beverages, into the baskets and the upper chamber to cool the articles. The grate is configured to separate the articles from the ice and melted ice in the lower chamber.

16 Claims, 4 Drawing Sheets

(56) References Cited

U.S. PATENT DOCUMENTS

| | | | |
|---|---|---|---|
| 7,950,249 B1* | 5/2011 | White | F25D 3/08 62/457.1 |
| 9,631,860 B2* | 4/2017 | Gossens | A47F 3/0426 |
| 2003/0173361 A1* | 9/2003 | Lee | B65D 21/0233 220/23.88 |
| 2005/0035120 A1* | 2/2005 | Hull | A45C 11/20 220/23.87 |
| 2006/0113317 A1* | 6/2006 | Tolbert | A45C 11/20 222/78 |
| 2016/0272405 A1* | 9/2016 | Furneaux | F25D 23/028 |

\* cited by examiner

US 10,099,816 B2

PORTABLE COOLING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to cooling assemblies and more particularly pertains to a new cooling assembly for separating food and beverages from ice.

BRIEF SUMMARY OF THE INVENTION

An embodiment of the disclosure meets the needs presented above by generally comprising a shell that has a top, which is open. A lid is reversibly couplable to the shell to close the top. The lid and the shell are insulated. A grate is positioned to reversibly couple to the shell substantially equally distant from a bottom and a midpoint of the shell. The grate defines an upper chamber and a lower chamber. A plurality of baskets is reversibly couplable to the shell and positionable in the upper chamber. The baskets are positioned proximate to the top. The top is configured to insert ice into the lower chamber, followed by the grate, and then articles, such as food and beverages, into the baskets and the upper chamber to cool the articles. The grate is configured to separate the articles from the ice and melted ice in the lower chamber.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
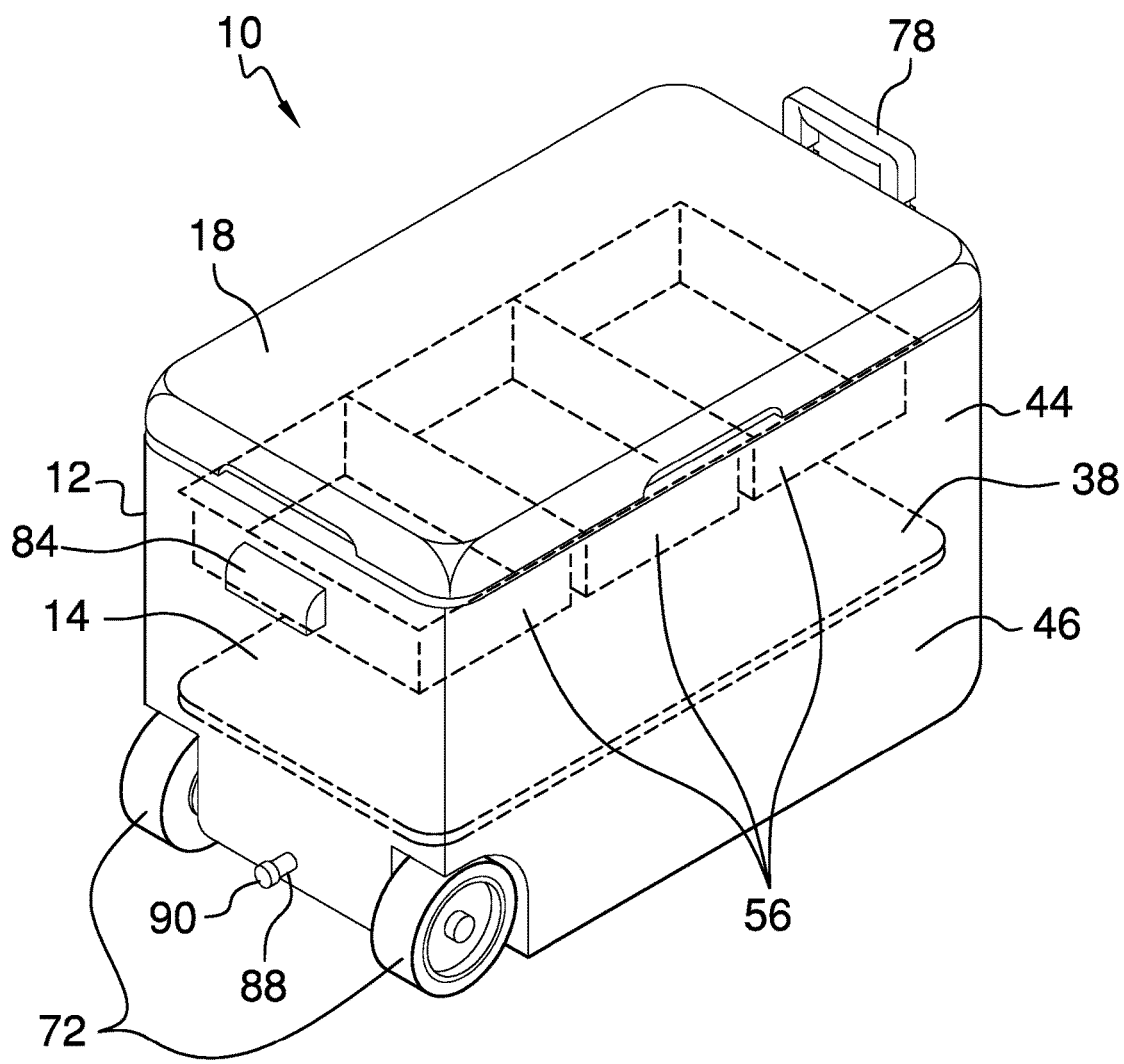
FIG. 1 is an isometric perspective view of a portable cooling assembly according to an embodiment of the disclosure.
Figure 2:
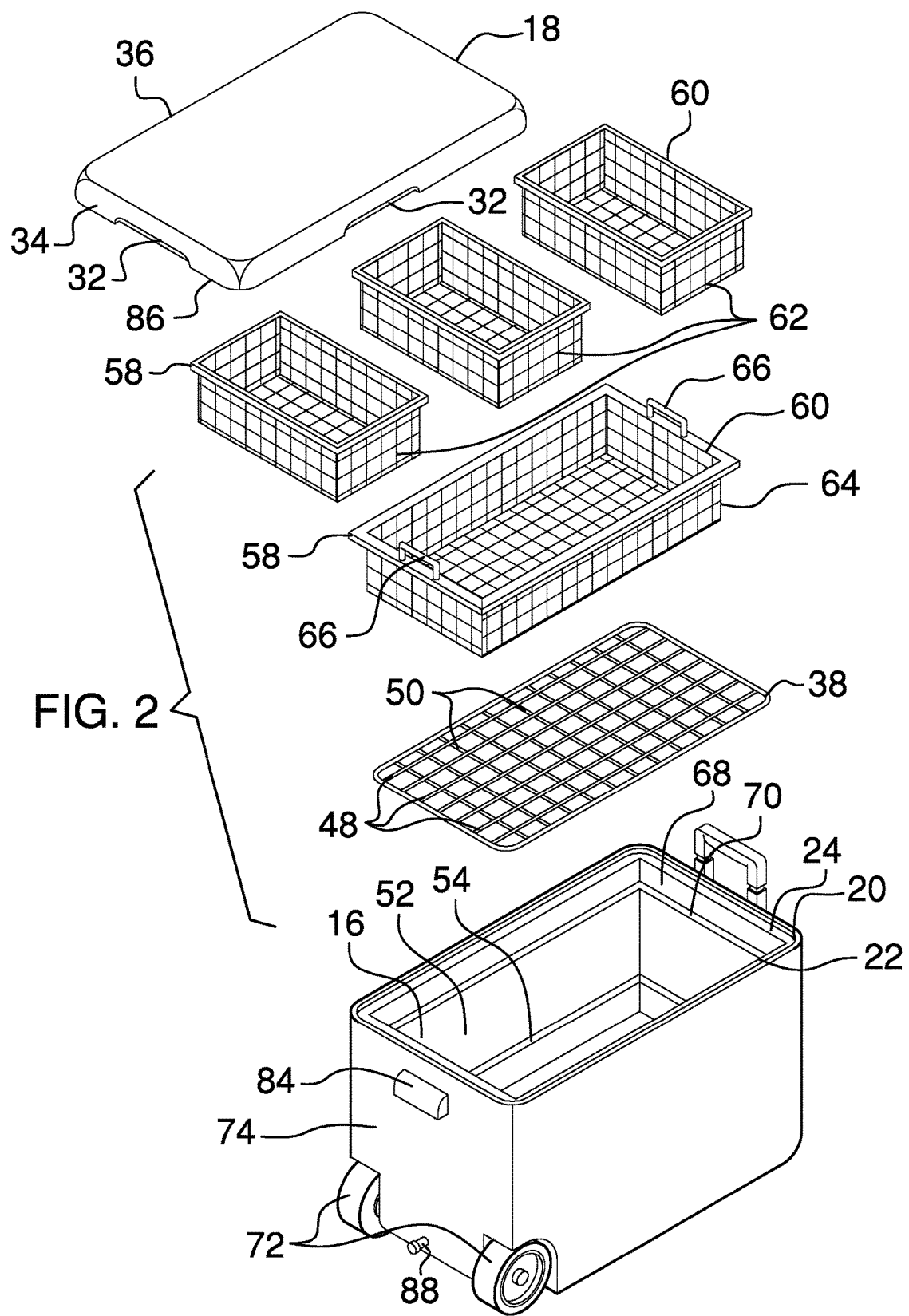
FIG. 2 is an exploded view of an embodiment of the disclosure.
Figure 3:
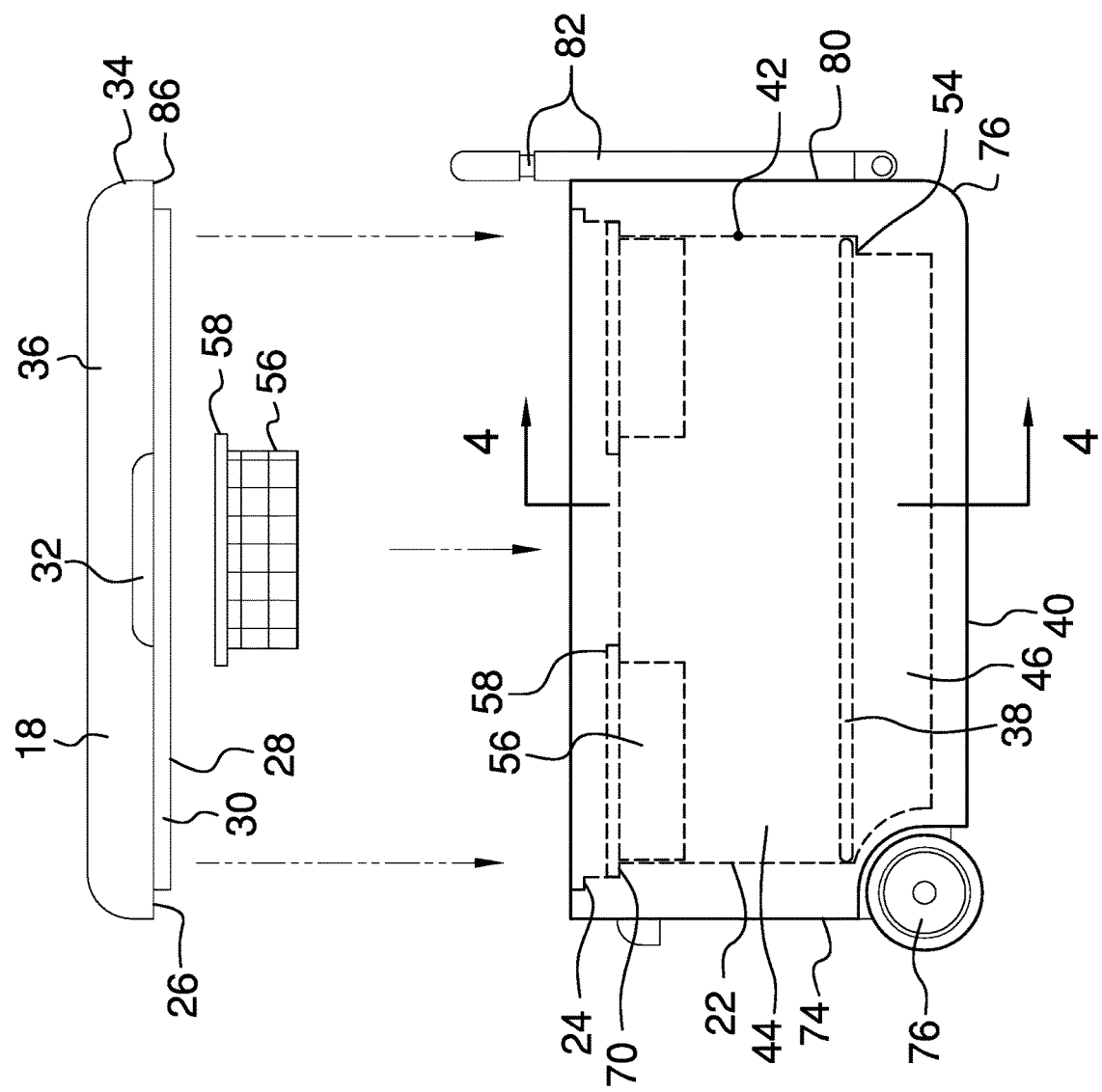
FIG. 3 is a side view of an embodiment of the disclosure.
Figure 4:
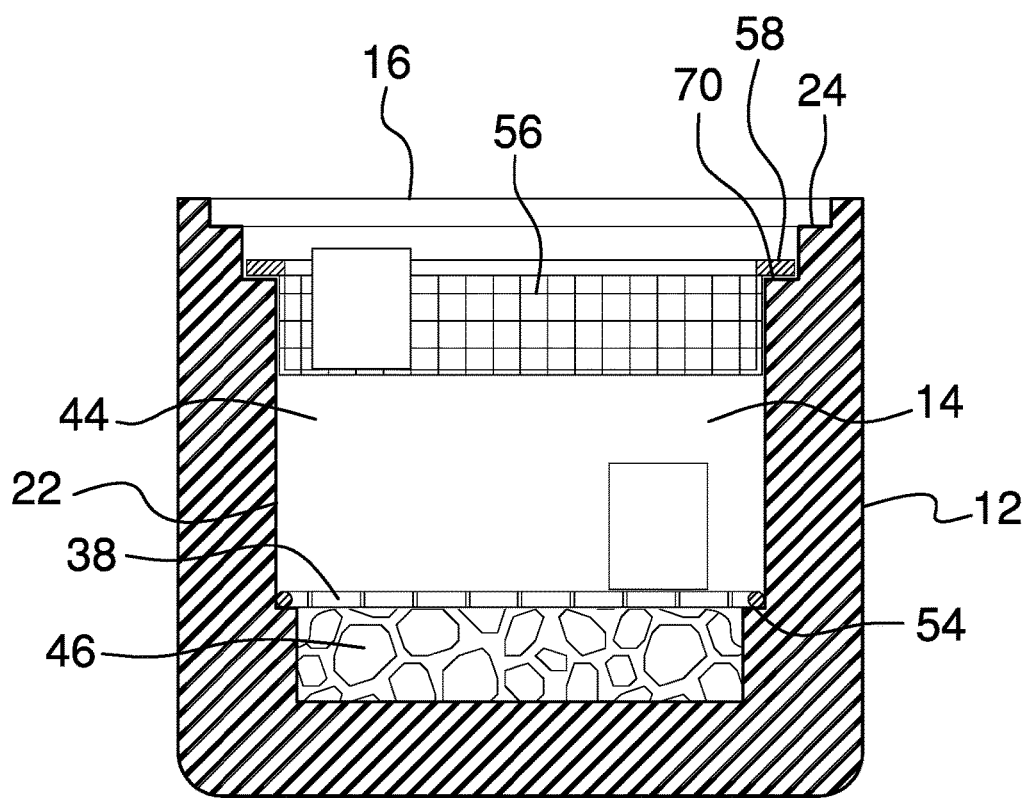
FIG. 4 is a cross-sectional view of an embodiment of the disclosure.

With reference now to the drawings, and in particular to FIGS. 1 through 4 thereof, a new cooling assembly embodying the principles and concepts of an embodiment of the disclosure and generally designated by the reference numeral 10 will be described.

As best illustrated in FIGS. 1 through 4, the portable cooling assembly 10 generally comprises a shell 12 that defines an interior space 14. The shell 12 is insulated. The shell 12 has a top 16 that is open. In one embodiment, the shell 12 is substantially rectangularly box shaped.

The assembly 10 comprises a lid 18 that is complementary to the top 16. The lid 18 is insulated. The lid 18 is reversibly couplable to the shell 12 to close the top 16. The top 16 is configured to insert ice and articles, such as food and beverages, into the interior space 14. The lid 18 is positioned to couple to the shell 12 to close the top 16. The articles that are positioned within the interior space 14 are configured to be cooled.

A first inset 20 is positioned around an inner perimeter 22 of the shell 12 proximate to the top 16 to define a first ridge 24. A second inset 26 is positioned in a lower surface 28 of the lid 18. The second inset 26 is positioned around an outer perimeter 86 of the lid 18 to define an insert 30. The top 16 is positioned to admit the insert 30 so that the insert 30 is positioned on the first ridge 24 to couple the lid 18 to the shell 12.

A plurality of cutouts 32 is positioned in the lid 18 proximate to the second inset 26. Each cutout 32 is configured to insert digits of a hand of a user to decouple the lid 18 from the shell 12. In one embodiment, the plurality of cutouts 32 comprises four cutouts 32 that are positioned singly in opposing ends 34 and opposing sides 36 of the lid 18.

A grate 38 is reversibly couplable to the shell 12 and positionable in the interior space 14. The grate 38 is positioned to couple to the shell 12 substantially equally distant from a bottom 40 and a midpoint 42 of the shell 12. The grate 38 is substantially coplanar with the bottom 40 and defines an upper chamber 44 and a lower chamber 46. The top 16 is configured to insert the grate 38 so that the grate 38 is positioned in the shell 12. The grate 38 is configured to separate the articles that are positioned in the upper chamber 44 from the ice and melted ice that is positioned in the lower chamber 46.

In one embodiment, the grate 38 comprises a plurality of first rods 48 and a plurality of second rods 50. The first rods 48 are coplanarly and parallelly positioned. Each second rod 50 is coupled to and extends perpendicularly between each of the first rods 48. The second rods 50 are parallelly positioned.

A third inset 52 is positioned around the inner perimeter 22 of the shell 12 substantially equally distant from the bottom 40 and the midpoint 42 of the shell 12 to define a second ridge 54. The third inset 52 is circumferentially smaller than the first inset 20. The top 16 is positioned to insert the grate 38 so that the grate 38 is positioned on the second ridge 54 to couple the grate 38 to the shell 12. The grate 38 is configured to separate the articles that are positioned in the upper chamber 44 from the ice and the melted ice that is positioned in the lower chamber 46.

A plurality of baskets 56 is reversibly couplable to the shell 12 and positionable in the upper chamber 44. The baskets 56 are positioned proximate to the top 16 in the upper chamber 44. The baskets 56 are configured to position the articles so the articles are configured to be cooled. In one embodiment, the baskets 56 are substantially rectangularly box shaped. The baskets 56 are open-topped and meshed. Each basket 56 has a lip 58 that is coupled to and extends from an upper perimeter 60 of the basket 56. In another embodiment, the baskets 56 are substantially equally sized. In yet another embodiment, the plurality of baskets 56 comprises three first trays 62. In still yet another embodiment, the plurality of baskets 56 comprises a second tray 64. The second tray 64 is substantially complementary to the inner perimeter 22 of the shell 12.

Each of a pair of grasps 66 is coupled to and extends from the second tray 64. The grasps 66 are substantially C-shaped. Each grasp 66 is configured to insert the digits of a respective hand of the user to reversibly insert the second tray 64 into the interior space 14.

A fourth inset 68 is positioned around the inner perimeter 22 of the shell 12 below and proximate to the first inset 20 to define a third ridge 70. The fourth inset 68 is circumferentially smaller than the first inset 20 and circumferentially larger than the third inset 52. The top 16 is positioned to insert the baskets 56 so that the lips 58 of the baskets 56 are positioned on the third ridge 70 to couple the baskets 56 to the shell 12. The baskets 56 are configured to position the articles so that the articles are configured to be cooled.

A pair of rollers 72 is rotationally coupled to the shell 12. The rollers 72 are positioned on a first end 74 of the shell 12 adjacent to the bottom 40 and a respective corner 76 of the shell 12. In one embodiment, the rollers 72 are substantially inset into the shell 12.

A first handle 78 is coupled to a second end 80 of the shell 12. The first handle 78 comprises a plurality of nested sections 82 so that the first handle 78 is extensible. The first handle 78 is configured to be grasped in the hand of the user to motivate the shell 12 upon the rollers 72.

A second handle 84 is coupled to the first end 74 of the shell 12 proximate to the top 16. The second handle 84 is configured to lift the shell 12.

In one embodiment of the invention, a pipe 88 is coupled to and positioned through the first end 74 of the shell 12 so that the pipe 88 is fluidically coupled to the lower chamber 46. A cap 90 is reversibly couplable to the pipe 88 to selectively close the pipe 88. The cap 90 is configured for selectively decoupling from the pipe 88 so that the pipe 88 is configured to drain the water from the lower chamber 46.

In use, the cutouts 32 positioned in the lid 18 are configured to insert the digits of the hand of the user to decouple the lid 18 from the shell 12. The top 16 is configured to insert the ice into the lower chamber 46 followed by the grate 38. The grate 38 is positioned on the second ridge 54 to couple the grate 38 to the shell 12. The top 16 is positioned to insert the baskets 56 so that the lips 58 of the baskets 56 are positioned on the third ridge 70 to couple the baskets 56 to the shell 12. The baskets 56 are configured to position the articles, such as the food and the beverages, into the baskets 56 and the upper chamber 44. The grate 38 is configured to separate the articles that are positioned in the upper chamber 44 from the ice and the melted ice that is positioned in the lower chamber 46. The top 16 is positioned to admit the insert 30 so that the insert is positioned on the first ridge 24 to couple the lid 18 to the shell 12 to close the top 16. The articles that are positioned within the upper chamber 44 are configured to be cooled. The cap 90 is configured for selectively decoupling from the pipe 88 so that the pipe 88 is configured to drain the water from the lower chamber 46.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable cooling assembly comprising:
  a shell defining an interior space, said shell being insulated, said shell having a top, said top being open;
  a lid complementary to said top, said lid being insulated, said lid being reversibly couplable to said shell to close said top;
  a grate reversibly couplable to said shell and positionable in said interior space, said grate being positioned for coupling to said shell substantially equally distant from a bottom and a midpoint of said shell such that said grate is substantially coplanar with said bottom defining an upper chamber and a lower chamber;
  a plurality of baskets reversibly couplable to said shell and positionable in said upper chamber, said baskets being positioned proximate to said top;
  wherein said top is positioned in said shell such that said top is configured for inserting ice into said lower chamber, said grate into said interior space, and articles, such as food and beverages, into said baskets and said upper chamber, wherein said grate is positioned in said shell such that said grate is configured for separating the articles positioned in said upper chamber from the ice and melted ice positioned in said lower chamber, wherein said lid is positioned for coupling to said shell for closing said top such that the articles positioned within said upper chamber are configured for cooling;

a first inset positioned around an inner perimeter of said shell proximate to said top defining a first ridge, said first ridge being parallel to said top of said shell;

a second inset positioned in a lower surface of said lid, said second inset being positioned around an outer perimeter of said lid defining an insert;

wherein said top is positioned in said shell such that said top is positioned for inserting said insert such that said insert is positioned on said first ridge for coupling said lid to said shell; and a third inset positioned fully around said inner perimeter of said shell substantially equally distant from said bottom and said midpoint of said shell defining a second ridge having a planar upwardly facing surface extending fully around said inner perimeter of said shell, said second ridge being parallel to said first ridge and said top of said shell, said third inset being circumferentially smaller than said first inset, wherein said top is positioned in said shell such that said top is positioned for inserting said grate such that said grate is positioned on said second ridge for coupling said grate to said shell such that said grate is configured for separating the articles positioned in said upper chamber from the ice and the melted ice positioned in said lower chamber.

2. The assembly of claim 1, further including said shell being substantially rectangularly box shaped.

3. The assembly of claim 1, further including a plurality of cutouts positioned in said lid proximate to said second inset, wherein said cutouts are positioned in said lid such that said cutouts are configured for inserting digits of a hand of a user for decoupling said lid from said shell.

4. The assembly of claim 3, further including said plurality of cutouts comprising four said cutouts positioned singly in opposing ends and opposing sides of said lid.

5. The assembly of claim 1, further including said grate comprising a plurality of first rods and a plurality of second rods, said first rods being coplanarly and parallelly positioned, each said second rod being coupled to and extending perpendicularly between each of said first rods such that said second rods are parallelly positioned.

6. The assembly of claim 1, further including said baskets being substantially rectangularly box shaped, said baskets being open-topped, said baskets being meshed, each said basket having a lip coupled to and extending from an upper perimeter of said basket, said baskets being substantially equally sized.

7. The assembly of claim 1, further including said plurality of baskets comprising three first trays.

8. The assembly of claim 7, further including said plurality of baskets comprising a second tray, said second tray being substantially complementary to said inner perimeter of said shell.

9. The assembly of claim 8, further including a pair of grasps coupled to and extending from said second tray, said grasps being substantially C-shaped, wherein each said grasp is positioned on said second tray such that said grasp is configured for inserting digits of a respective hand of the user for reversibly inserting said second tray into said interior space.

10. The assembly of claim 1, further including a fourth inset positioned around said inner perimeter of said shell below and proximate to said first inset defining a third ridge, said fourth inset being circumferentially smaller than said first inset and circumferentially larger than said third inset, wherein said top is positioned in said shell such that said top is positioned for inserting said baskets such that said lips of said baskets are positioned on said third ridge for coupling said baskets to said shell such that said baskets are configured for positioning the articles such that the articles are configured for cooling.

11. The assembly of claim 1, further including a pair of rollers rotationally coupled to said shell, said rollers being positioned on a first end of said shell adjacent to said bottom and a respective corner of said shell.

12. The assembly of claim 11, further including said rollers being substantially inset into said shell.

13. The assembly of claim 11, further including a first handle coupled to a second end of said shell, said first handle comprising a plurality of nested sections such that said first handle is extensible, wherein said first handle is positioned on said shell such that said first handle is configured for grasping in the hand of the user for motivating said shell upon said rollers.

14. The assembly of claim 13, further including a second handle coupled to said first end of said shell proximate to said top, wherein said second handle is positioned on said shell such that said second handle is configured for lifting said shell.

15. The assembly of claim 1, further comprising:
a pipe coupled to and positioned through a first end of said shell such that said pipe is fluidically coupled to said lower chamber;
a cap reversibly couplable to said pipe for selectively closing said pipe; and
wherein said cap is configured for selectively decoupling from said pipe such that said pipe is configured for draining the water from said lower chamber.

16. A portable cooling assembly comprising:
a shell defining an interior space, said shell being insulated, said shell having a top, said top being open, said shell being substantially rectangularly box shaped;
a lid complementary to said top, said lid being insulated, said lid being reversibly couplable to said shell to close said top, wherein said top is positioned in said shell such that said top is configured for inserting ice and articles, such as food and beverages, into said interior space, wherein said lid is positioned for coupling to said shell for closing said top such that the articles positioned within said interior space are configured for cooling;
a first inset positioned around an inner perimeter of said shell proximate to said top defining a first ridge, said first ridge being parallel to said top of said shell;
a second inset positioned in a lower surface of said lid, said second inset being positioned around an outer perimeter of said lid defining an insert, wherein said top is positioned in said shell such that said top is positioned for inserting said insert such that said insert is positioned on said first ridge for coupling said lid to said shell;
a plurality of cutouts positioned in said lid proximate to said second inset, wherein said cutouts are positioned in said lid such that said cutouts are configured for inserting digits of a hand of a user for decoupling said lid from said shell, said plurality of cutouts comprising four said cutouts positioned singly in opposing ends and opposing sides of said lid;

a grate reversibly couplable to said shell and positionable in said interior space, said grate being positioned for coupling to said shell substantially equally distant from a bottom and a midpoint of said shell such that said grate is substantially coplanar with said bottom defining an upper chamber and a lower chamber, wherein said top is positioned in said shell such that said top is configured for inserting said grate, wherein said grate is positioned in said shell such that said grate is configured for separating the articles positioned in said upper chamber from the ice and melted ice positioned in said lower chamber, said grate comprising a plurality of first rods and a plurality of second rods, said first rods being coplanarly and parallelly positioned, each said second rod being coupled to and extending perpendicularly between each of said first rods such that said second rods are parallelly positioned;

a third inset positioned fully around said inner perimeter of said shell substantially equally distant from said bottom and said midpoint of said shell defining a second ridge having a planar upwardly facing surface extending fully around said inner perimeter of said shell, said second ridge being parallel to said first ridge and said top of said shell, said third inset being circumferentially smaller than said first inset, wherein said top is positioned in said shell such that said top is positioned for inserting said grate such that said grate is positioned on said second ridge for coupling said grate to said shell such that said grate is configured for separating the articles positioned in said upper chamber from the ice and the melted ice positioned in said lower chamber;

a plurality of baskets reversibly couplable to said shell and positionable in said upper chamber, said baskets being positioned proximate to said top, wherein said baskets are positioned in said upper chamber such that said baskets are configured for positioning the articles such that the articles are configured for cooling, said baskets being substantially rectangularly box shaped, said baskets being open-topped, said baskets being meshed, each said basket having a lip coupled to and extending from an upper perimeter of said basket, said baskets being substantially equally sized, said plurality of baskets comprising three first trays, said plurality of baskets comprising a second tray, said second tray being substantially complementary to said inner perimeter of said shell;

a pair of grasps coupled to and extending from said second tray, said grasps being substantially C-shaped, wherein each said grasp is positioned on said second tray such that said grasp is configured for inserting digits of a respective hand of the user for reversibly inserting said second tray into said interior space;

a fourth inset positioned around said inner perimeter of said shell below and proximate to said first inset defining a third ridge, said fourth inset being circumferentially smaller than said first inset and circumferentially larger than said third inset, wherein said top is positioned in said shell such that said top is positioned for inserting said baskets such that said lips of said baskets are positioned on said third ridge for coupling said baskets to said shell such that said baskets are configured for positioning the articles such that the articles are configured for cooling;

a pair of rollers rotationally coupled to said shell, said rollers being positioned on a first end of said shell adjacent to said bottom and a respective corner of said shell, said rollers being substantially inset into said shell;

a first handle coupled to a second end of said shell, said first handle comprising a plurality of nested sections such that said first handle is extensible, wherein said first handle is positioned on said shell such that said first handle is configured for grasping in the hand of the user for motivating said shell upon said rollers;

a second handle coupled to said first end of said shell proximate to said top, wherein said second handle is positioned on said shell such that said second handle is configured for lifting said shell;

a pipe coupled to and positioned through said first end of said shell such that said pipe is fluidically coupled to said lower chamber;

a cap reversibly couplable to said pipe for selectively closing said pipe, wherein said cap is configured for selectively decoupling from said pipe such that said pipe is configured for draining the water from said lower chamber; and wherein said cutouts are positioned in said lid such that said cutouts are configured for inserting the digits of the hand of the user for decoupling said lid from said shell, wherein said top is positioned in said shell such that said top is configured for inserting the ice into said lower chamber, wherein said top is positioned for inserting said grate such that said grate is positioned on said second ridge for coupling said grate to said shell, wherein said top is positioned for inserting said baskets such that said lips of said baskets are positioned on said third ridge for coupling said baskets to said shell such that said baskets are configured for positioning the articles, such as the food and the beverages, into said baskets and said upper chamber, such that said grate is configured for separating the articles positioned in said upper chamber from the ice and the melted ice positioned in said lower chamber, wherein said top is positioned in said shell such that said top is positioned for inserting said insert such that said insert is positioned on said first ridge for coupling said lid to said shell for closing said top such that the articles positioned within said upper chamber are configured for cooling wherein said cap is configured for selectively decoupling from said pipe such that said pipe is configured for draining the water from said lower chamber.

* * * * *